(12) United States Patent
Howe et al.

(10) Patent No.: US 7,572,514 B2
(45) Date of Patent: Aug. 11, 2009

(54) PROCESS FOR THE PRODUCTION OF AN ASSEMBLY COMPRISING SEVERAL SILICONE ELEMENTS CROSSLINKED BY POLYADDITION AND ADHERING FIRMLY TO ONE ANOTHER

(75) Inventors: Fabienne Howe, Caluire (FR); Alain Pouchelon, Meyzieu (FR)

(73) Assignee: Rhodia Chimie, Boulogne-Billancourt (FR)

( * ) Notice: Subject to any disclaimer, the term of this patent is extended or adjusted under 35 U.S.C. 154(b) by 498 days.

(21) Appl. No.: 10/518,404

(22) PCT Filed: Jun. 17, 2003

(86) PCT No.: PCT/FR03/01831

§ 371 (c)(1),
(2), (4) Date: Aug. 5, 2005

(87) PCT Pub. No.: WO03/106054

PCT Pub. Date: Dec. 24, 2003

(65) Prior Publication Data

US 2006/0046077 A1    Mar. 2, 2006

(30) Foreign Application Priority Data

Jun. 17, 2002    (FR) .................... 02 07445

(51) Int. Cl.
*B32B 9/00* (2006.01)
(52) U.S. Cl. ............... 428/447; 428/446; 428/448; 528/15; 528/31; 528/32; 528/33; 528/10; 528/12
(58) Field of Classification Search ........... 528/15, 528/31–33, 10, 12; 428/447, 446–448
See application file for complete search history.

(56) References Cited

U.S. PATENT DOCUMENTS

| | | | |
|---|---|---|---|
| 4,163,082 A | 7/1979 | Romenesko | 428/447 |
| 4,508,606 A | 4/1985 | Andrade et al. | 204/169 |
| 4,791,029 A | 12/1988 | Fau et al. | 428/447 |
| 4,874,671 A | 10/1989 | Tahara et al. | 428/447 |
| 5,147,397 A | 9/1992 | Christ et al. | 623/6 |
| 5,364,662 A | 11/1994 | Domenico et al. | 427/536 |
| 5,506,302 A | 4/1996 | Shiono et al. | 524/731 |
| 5,827,921 A | 10/1998 | Osawa et al. | 524/837 |
| 5,998,536 A | 12/1999 | Bertry et al. | 524/557 |
| 6,265,690 B1 | 7/2001 | Förnsel et al. | 219/121.5 |
| 2002/0012756 A1 | 1/2002 | Kuckertz et al. | 427/569 |
| 2002/0061365 A1 | 5/2002 | Grape et al. | 427/387 |

FOREIGN PATENT DOCUMENTS

| | | |
|---|---|---|
| DE | 199 46 252 | 4/2001 |
| EP | 0 431 979 | 6/1991 |
| EP | 0 647 477 | 4/1995 |
| EP | 0 702 068 | 3/1996 |
| EP | 0 712 956 | 5/1996 |
| EP | 0 819 735 | 1/1998 |
| EP | 0 659 857 | 4/1998 |
| EP | 0 866 164 | 9/1998 |
| EP | 0 643 106 | 12/1999 |
| EP | 1 078 823 | 2/2001 |
| FR | 2 617 760 | 1/1989 |
| GB | 2 045 824 | 11/1980 |
| JP | 03-122185 | 5/1991 |
| JP | 10-025698 | 1/1998 |
| WO | WO 95/19394 | 7/1995 |
| WO | WO 01/78891 | 10/2001 |

*Primary Examiner*—Randy Gulakowski
*Assistant Examiner*—Olatunde S Ojurongbe
(74) *Attorney, Agent, or Firm*—James C. Lydon

(57) ABSTRACT

A process for production of an assembly including several silicone elements crosslinked by polyaddition of $\equiv$Si—H units onto $\equiv$Si-alkenyl (preferably $\equiv$Si-vinyl) units, the elements adhering to one another without detracting from their mechanical properties. The process includes: (I) forming ($1^{st}$ coating) a silicone element (i) with a liquid silicone preparation (i) containing polyorganosiloxanes (POS) A with $\equiv$Si-vinyl units, (POS) B with $\equiv$Si—H units, a platinum catalyst C; (II) crosslinking so that (i) has a surface density SD of unreacted, residual vinyl, per $nm^2$, of $0.0100 \geq SD \geq 0.0040$; (III) optionally repeating steps (I) and (II) n times to give n elements (i) that adhere to one another; (IV) forming ($2^{nd}$ coating) a silicone element (ii) with a liquid silicone preparation (ii) of the same type as described above; (v) crosslinking to give crosslinked (ii) that adheres to (i).

15 Claims, No Drawings

PROCESS FOR THE PRODUCTION OF AN ASSEMBLY COMPRISING SEVERAL SILICONE ELEMENTS CROSSLINKED BY POLYADDITION AND ADHERING FIRMLY TO ONE ANOTHER

The invention relates to the field of articles made of silicone elastomer crosslinked by the polyaddition of ≡Si—H units onto ≡Si-alkenyl (preferably ≡Si-vinyl) units belonging to polyorganosiloxanes (POS).

Liquid silicone preparations from which these crosslinked elements can be obtained are especially:

- POS compositions vulcanizable by polyaddition at room temperature (with possible activation at higher temperature) which are two-component (RTV II) or in the form of one component (RTV) and advantageously have a viscosity at 25° C. of at most 200,000 mPa·s and preferably of between 10 and 50,000 mPa·s;
- POS compositions vulcanizable by polyaddition under the action of heat which are two-component or one-component, are called LSR and advantageously have a viscosity at 25° C. of between 100 and 500,000 mPa·s;
- POS compositions vulcanizable by polyaddition under the action of heat (EVC) which have a rubbery consistency with a viscosity at 25° C. notably above 1 million mPa·s.

Of particular interest within the framework of the invention are compositions for the production of articles comprising several formed silicone elements crosslinked in a distinct way and intended to be firmly fixed to one another.

The major problem underlying such articles is that of silicone/silicone adhesion. In fact, a silicone elastomer is intrinsically anti-adhesive, so it is difficult to firmly fix together two layers or two masses of crosslinked silicone elastomer.

This problem of silicone/silicone adhesion is particularly acute in the applications of silicone elastomers as multilayer coatings, for example for the protection or mechanical strengthening of various flexible substrates such as woven or non-woven fibrous substrates.

In fact, even though silicone coatings are generally monolayer for obvious economic reasons, there are applications which demand resistance to very high stresses over very long lifetimes and hence require multilayer silicone coatings.

This is particularly the case of the application relating to the manufacture of bags for the individual protection of vehicle occupants, or airbags.

Traditionally the latter are formed of a cloth made of synthetic fiber, for example polyamide (Nylon®), covered on at least one of these faces with a protective layer or coating (composite) is dictated by the fact that the gases released by the gas generator in the event of impact are extremely hot and contain incandescent particles capable of damaging the polyamide bag.

The inner protective layer made of elastomer must therefore be particularly resistant to high temperatures and mechanical stresses.

It is also important for this elastomer coating to be in the form of a thin, uniform film that adheres perfectly to the synthetic fabric substrate forming the walls of the airbag.

Another essential property of the elastomer coating is that of ageing resistance, i.e. preservation of the thermal, mechanical and adhesive properties over time. The composite therefore has to offer a very good fatigue strength throughout the life of the airbag, i.e. in the order of 15 years. This fatigue strength is judged professionally by the scrub test, in which the fabric is repeatedly rubbed; the fabric should commonly withstand around 1000 rubs without showing adhesion defects between the silicone and the textile or, if appropriate, between the various layers of silicone. This last property generally requires complex and ingenious formulating and processing skills.

In another field, namely the molding of large engineering parts, the adhesion between two solid silicone bodies is also a difficult property to achieve. This corresponds e.g. to the case of large moldings which cannot be obtained in a single casting, or to the repair of damaged molds or parts. Thus it is very often necessary to resort to treatments which, despite the complexity they create, never offer the assurance of success.

Given this state of the art, one of the essential objects of the present invention is to propose an advantageous and efficient solution to the problem of the lack of silicone/silicone adhesion in assemblies comprising several elements made of crosslinked silicone elastomer, it being possible for these assemblies to be composites of flexible substrate (e.g. fabric, mesh or plastic film)/multilayer silicone elastomer coating, or more massive articles containing a first block of crosslinked RTV, EVC or LSR silicone elastomer that is intended to adhere for a greater or lesser length of time to one or more layers or parts of the same nature as this first block (e.g. molded articles or molds).

Another essential object of the invention is to provide a process for the production of an assembly comprising several silicone elements crosslinked by the polyaddition of ≡Si—H units onto ≡Si-alkenyl (preferably ≡Si-vinyl) units, these elements adhering firmly to one another without detracting from the mechanical properties of the crosslinked silicone elements.

Another essential object of the invention is to provide a process for the production of an assembly comprising several silicone elements crosslinked by the polyaddition of ≡Si—H units onto ≡Si-alkenyl (preferably ≡Si-vinyl) units, these elements adhering firmly to one another without detracting from the hydrophobic and/or oleophobic properties of the crosslinked silicone elements that are exploited in certain applications.

Another essential object of the invention is to provide a process for the production of an assembly comprising several silicone elements crosslinked by the polyaddition of ≡Si—H units onto ≡Si-alkenyl (preferably ≡Si-vinyl) units, these elements adhering firmly to one another without detracting from the esthetic qualities of the crosslinked silicone elements that are exploited in certain applications.

Another essential object of the invention is to provide a variation of the process referred to in the previous paragraph which consists of a process for the multilayer coating of a flexible substrate (especially fibrous or polymer substrate, e.g. textile substrate) with crosslinkable silicone elastomer compositions, making it possible to manufacture composites in which the multilayer adheres perfectly to the flexible substrate and has a homogeneous and coherent structure that is only slightly subject, if at all, to delamination of the layers of crosslinked silicone elastomer which adhere well to one another.

Another essential object of the invention is to provide a variation of the process referred to in the previous paragraph which consists of a batch process for the molding of silicone parts that are perfectly stuck to one another to the extent that the assembly formed in fine is coherent and homogeneous from the physical point of view.

Another of the inventors' objectives was to develop silicone compositions suitable for the production of a composite consisting of a flexible substrate (especially fibrous or polymer substrate, e.g. textile substrate) covered with a multilayer coating of crosslinked silicone elastomer, said multilayer coating adhering perfectly to the substrate and comprising layers of crosslinked silicone that also adhere perfectly to one another and hence are only slightly subject, if at all, to delamination.

Another of the inventors' objectives was to develop silicone compositions suitable for the production of a composite consisting of a flexible substrate (especially fibrous or polymer substrate, e.g. textile substrate) covered with a multilayer coating of crosslinked silicone elastomer, characterized by a good cohesion, good mechanical properties, a good crumple resistance (scrub test), good hydrophobic/oleophobic properties, an attractive appearance and, on its outer face(s), anti-adhesive properties.

These and other objects are achieved by the present invention, which relates first and foremost to a process for the production of an assembly comprising several silicone elements crosslinked by the polyaddition of ≡Si—H units onto ≡Si-alkenyl (preferably ≡Si-vinyl) units, said elements adhering firmly to one another, characterized in that it comprises the following essential steps:

(I) forming a silicone element (i) with a liquid silicone preparation (i) comprising:
  polyorganosiloxanes (POS) A with ≡Si-alkenyl (preferably ≡Si-vinyl) units,
  polyorganosiloxanes (POS) B with ≡Si—H units,
  at least one metal catalyst C, preferably based on platinum,
  optionally at least one POS resin D carrying ≡Si-alkenyl (preferably ≡Si-vinyl) units,
  optionally at least one crosslinking inhibitor E,
  optionally at least one adhesion promoter F,
  optionally at least one mineral filler G,
  optionally at least one functional additive H for imparting specific properties,
(II) crosslinking the liquid silicone preparation (i) formed in step (I), the composition of this preparation and the crosslinking conditions being chosen in such a way that the crosslinked silicone element (i) has a surface density SD of unreacted, residual alkenyl (preferably vinyl) or hydrogen groups, per square nanometer, defined as follows:
  $SD \geq 0.0015$,
  preferably $SD \geq 0.0030$,
  and particularly preferably $0.0100 \geq SD \geq 0.0040$.
(III) optionally repeating steps (I) and (II) n times (n=positive integer) to give n elements (i) that adhere to one another,
(IV) forming a silicone element (ii) by a process which consists in bringing the crosslinked silicone element or last crosslinked silicone element (i) into contact with a liquid silicone preparation (ii) comprising:
  polyorganosiloxanes (POS) A' with ≡Si-alkenyl (preferably ≡Si-vinyl) units,
  polyorganosiloxanes (POS) B' with ≡Si—H units,
  at least one metal catalyst C', preferably based on platinum,
  optionally at least one POS resin D' carrying ≡Si-alkenyl (preferably ≡Si-vinyl) units,
  optionally at least one crosslinking inhibitor E',
  optionally at least one adhesion promoter F',
  optionally at least one mineral filler G',
  optionally at least one functional additive H' for imparting specific properties,
(V) crosslinking the liquid silicone preparation (ii) formed in step (III) to give the crosslinked silicone element (ii) that adheres to the element or last element (i).

It is to the inventors' credit to have used, in a sequential shaping/crosslinking procedure, specific and carefully selected formulations of liquid POS preparations crosslinkable by polyaddition (hydrosilylation) to give silicone elastomers and capable of imparting, to the crosslinked silicone element (i) which they make it possible to produce, surface properties that allow excellent bonding with another crosslinked silicone element obtained in the same manner as the element (i) with a crosslinkable liquid POS preparation (ii) intrinsically identical to or different from the preparation (i).

The POS composition (i) comprising the components ABC (and optionally DEFG) of step (I) determines the strength of the bond with the crosslinked silicone element (i) or (ii) which will subsequently come into contact with the element (i) produced from this POS composition (i) comprising the components ABC (and optionally DEFG).

The invention makes it possible to produce assemblies of differentiated crosslinked silicone elastomer elements, particularly laminates, which are cohesive and furthermore have excellent mechanical, hydrophobic/oleophobic and surface anti-adhesive properties and the conventional appearance of silicone compositions.

This does not compromise the economic component.

Even in the case where the outer element (ii) of the crosslinked silicone assembly comprises the composition (i) that promotes silicone/silicone adhesion, the anti-adhesive properties towards other materials are preserved.

The surface density SD of residual reactive groups is defined as the number of these groups per unit surface area in the outermost surface layer of the material in question. In the case of silicones, the monomolecular layer has a thickness of 0.75 nm.

The surface density SD is consequently obtained by weighting the results of a prorata volume analysis of the thicknesses in question. This content will thus be expressed as:

$$\text{number of groups/nm}^2$$

The reference SD measurement method is given below.

According to one preferred characteristic of the process according to the invention, the ratio R of the ≡Si—H units to the ≡Si-alkenyl (preferably ≡Si-vinyl) units in the selected liquid silicone preparation (i) is defined as follows:

$R \leq 1$, preferably $0.80 \leq R \leq 0.98$.

Controlling the stoichiometry of the hydrosilylation reaction of the ≡Si-alkenyl (preferably ≡Si-vinyl) units by the ≡Si—H units to generate a residue of reactive units, especially on the surface, is both difficult and advantageous. This is very revealing of the inventive activity of the process according to the invention.

Preferably, the residual units are the ≡Si-alkyl (preferably ≡Si-vinyl) units.

It is possible to envisage several means of enriching the liquid POS preparation (i) comprising the components ABC (and optionally DEFG) of step (I). In one advantageous variant of the invention, this preparation (i) is a mixture of alkenylated (preferably vinylated) POS and comprises at least one hyperalkenylated (preferably hypervinylated) POS A° providing ≡Si-alkenyl (preferably ≡Si-vinyl) units, whose content is greater than or equal to at least 2% by number, preferably greater than or equal to at least 3% and particularly preferably between 3 and 10% by number, the ≡Si-alkenyl (preferably ≡Si-vinyl) units advantageously being carried essentially by siloxy units D: —$R_2SiO_{2/2}$— [where R is defined in the same way as Z below in the legend of formulae (1), (2), (3) and (4)].

An advantageous variation of the process according to the invention is a process for the laminated coating of silicone onto any substrate, for example a fabric, nonwoven, polymer film, etc. Such a process can be characterized in that:

the assembly produced comprises a preferably flexible substrate and several crosslinked silicone elements forming a multilayer coating adhering to the substrate; and:

step (I) consists in applying the liquid silicone preparation (i) to the substrate to form a crosslinked silicone layer (i), and step (IV) consists in applying the liquid silicone preparation (ii) to the crosslinked silicone layer or last crosslinked silicone layer (i) carrying residual reactive groups on the surface, to form a crosslinked silicone layer (ii).

In the case where mass crosslinked silicone elements are involved, they will no longer be referred to as superimposed layers but as pieces joined to one another. In one variant, the process can be a batch molding process (e.g. for large articles). In this case the assembly produced is a molded silicone object. In another variant, the process can be a process for the production of a silicone mold in several steps (or for the repair of a worn-out mold).

In some of the variants of the art according to the invention, steps (IV) and (V) are only carried out after a prolonged interruption of the process. In fact, the element or last element (i) of crosslinked silicone elastomer (e.g. the layer) obtained at the end of steps (I) & (II), or (III), is therefore laden with reactive residues on the surface. It is capable of remaining in this state for a long period, making it possible to defer subsequent bonding with the element (e.g. layer) (ii) (steps (IV) & (V)) or any additional element(s) (i). "Long period" is understood as meaning e.g. up to a week.

According to one advantageous characteristic of the invention, the last liquid silicone preparation (ii) is identical to or, preferably, different from the liquid silicone preparation (i) or the last such preparation; particularly preferably, it is devoid of hyperalkenylated POS A°.

In fact, it can be of value for the outer crosslinked silicone element (ii) to have optimized anti-adhesive properties, which is not the prime purpose of an element (e.g. layer) (i) derived from the liquid POS preparation comprising the components ABC(DEFG).

According to one noteworthy modality of the invention, the chosen POS (A & A') have siloxy units of the formula

$$W_a Z_b SiO_{(4-(a+b))/2} \quad (1)$$

in which:

the symbols W, which are identical or different, are each an alkenyl group and preferably a $C_2$-$C_6$ alkenyl;

the symbols Z, which are identical or different, are each a non-hydrolyzable monovalent hydrocarbon group that is devoid of an unfavorable action on the activity of the catalyst, is optionally halogenated and is preferably selected from alkyl groups having from 1 to 8 carbon atoms inclusive, and from aryl groups;

a is 1 or 2, b is 0, 1 or 2 and a+b is between 1 and 3;

optionally at least some of the other units are units of the empirical formula

$$Z_c SiO_{(4-c)/2} \quad (2)$$

in which Z is defined as above and c has a value of between 0 and 3.

A very large majority of the POS (A & A') can be formed of units of formula (1), or they can also contain units of formula (2). Likewise, they can have a linear structure. Their degree of polymerization is preferably between 2 and 5000.

Z is generally selected from methyl, ethyl and phenyl radicals, at least 60 mol % of the radicals Z being methyl radicals.

Examples of siloxy units of formula (1) are the vinyldimethylsiloxane unit, the vinylphenylmethylsiloxane unit and the vinylsiloxane unit.

Examples of siloxy units of formula (2) are $SiO_{4/2}$, dimethylsiloxane, methylphenylsiloxane, diphenylsiloxane, methylsiloxane and phenylsiloxane units.

Examples of POS (A & A') are dimethylpolysiloxanes with dimethylvinylsilyl ends, methylvinyldimethylpolysiloxane copolymers with trimethylsilyl ends, methylvinyldimethylpolysiloxane copolymers with dimethylvinylsilyl ends, and cyclic methylvinylpolysiloxanes.

The dynamic viscosity $\eta_d$ of this POS (A & A') is between 0.01 and 500 Pa·s and preferably between 0.01 and 300 Pa·s.

Preferably, the POS (A & A') comprises at least 95% of siloxy units D: $—R_2SiO_{2/2}$, where R is defined in the same way as Z or W, this percentage corresponding to the number of units per 100 silicon atoms.

Preferably, the alkenyl units W are vinyls carried by siloxy units D and optionally M and/or T.

The preferred POS (B & B') are selected from those comprising siloxy units of the formula

$$H_d L_e SiO_{(4-(d+e))/2} \quad (3)$$

in which:

the symbols L, which are identical or different, are each a non-hydrolyzable monovalent hydrocarbon group that is devoid of an unfavorable action on the activity of the catalyst, is optionally halogenated and is preferably selected from alkyl groups having from 1 to 8 carbon atoms inclusive, and from aryl groups;

d is 1 or 2, e is 0, 1 or 2 and d+e has a value of between 1 and 3;

optionally at least some of the other units being units of the empirical formula

$$L_g SiO_{(4-g)/2} \quad (4)$$

in which L is as defined above and g has a value of between 0 and 3.

Examples of POS (B & B') which may be mentioned are polydimethylsiloxane and methylhydrogenosiloxy-α,ω-dimethylhydrogenosiloxane. The POS (B & B') can be formed only of units of formula (1) or also contains units of formula (2).

The POS (B & B') can have a linear, branched, cyclic or network structure. The degree of polymerization is greater than or equal to 2 and more generally less than 100.

The dynamic viscosity $\eta_d$ of this POS (B & B') is between 5 and 1000 mPa·s and preferably between 10 and 500 mPa·s.

The group L is defined in the same way as the group Z above.

Examples of units of formula (1) are $H(CH_3)_2 SiO_{1/2}$, $HCH_3 SiO_{2/2}$ and $H(C_6H_5)SiO_{2/2}$.

Examples of units of formula (2) are the same as those given above for the units of formula (2).

Examples of POS (B & B') are:

dimethylpolysiloxanes with hydrogenodimethylsilyl ends, copolymers containing dimethylhydrogenomethylpolysiloxane units with trimethylsilyl ends, copolymers containing dimethylhydrogenomethylpolysiloxane units with hydrogenodimethylsilyl ends, hydrogenomethylpolysiloxanes with trimethylsilyl ends, cyclic hydrogenomethylpolysiloxanes, hydrogenosiloxane resins containing siloxy units M: $R_3SiO_{1/2}$, Q: $SiO_{4/2}$ and/or T: $RSiO_{3/2}$, and optionally D: —$R_2SiO_{2/2}$, where R═H or is defined in the same way as L.

The following may be mentioned as other examples of monovalent hydrocarbon groups Z or L that may be present in the POS (A & A')/(B & B') referred to above: methyl; ethyl; n-propyl; i-propyl; n-butyl; i-butyl; t-butyl; chloromethyl; dichloromethyl; α-chloroethyl; (α,β-dichloroethyl; fluoromethyl; difluoromethyl; α,β-difluoroethyl; 3,3,3-trifluoropropyl; trifluorocyclopropyl; 4,4,4-trifluorobutyl; 3,3,5,5,5-hexafluoropentyl; β-cyanoethyl; γ-cyanopropyl; phenyl; p-chlorophenyl; m-chlorophenyl; 3,5-dichlorophenyl; trichlorophenyl; tetrachlorophenyl; o-, p- or m-tolyl; α,α,α-trifluorotolyl; and xylyls such as 2,3-dimethylphenyl and 3,4-dimethylphenyl.

These groups can optionally be halogenated or they can be selected from cyanoalkyl radicals.

The halogens are e.g. fluorine, chlorine, bromine and iodine, chlorine or fluorine being preferred.

The POS (A & A')/(B & B') can consist of mixtures of different silicone oils.

These POS (A & A')/(B & B') can be:

RTV as defined above and in patents U.S. Pat. Nos. US-B-3,220,972; 3,284,406; 3,436,366; 3,697,473 and 4,340,709;

LSR as defined above;

or EVC as defined above.

Preferably, the alkenyl groups W of the POS (A & A') and/or of the POS resins (D & D') are vinyl groups Vi carried by siloxy units D and optionally M and/or T.

The POS resins (D & D') will preferably be selected from those containing at least one alkenyl radical in its structure, said resin having an alkenyl group content of between 0.1 and 20% by weight and preferably of between 0.2 and 10% by weight.

These resins are well-known branched organopolysiloxane oligomers or polymers that are available commercially. They take the form of solutions and preferably siloxane solutions. Their structure contains at least two different units selected from those of the formulae $R'_3SiO_{0.5}$ (unit M), $R'_2SiO$ (unit D), $R'SiO_{1.5}$ (unit T) and $SiO_2$ (unit Q), at least one of these units being a unit T or Q.

The radicals R' are identical or different and are selected from linear or branched $C_1$-$C_6$ alkyl radicals, $C_2$-$C_4$ alkenyl radicals, phenyl radicals and 3,3,3-trifluoropropyl radicals. Examples of alkyl radicals R' which may be mentioned are methyl, ethyl, isopropyl, tert-butyl and n-hexyl radicals, and examples of alkenyl radicals R' which may be mentioned are vinyl radicals.

It must be understood that, in the POS resins (D & D') of the aforementioned type, some of the radicals R' are alkenyl radicals.

Examples which may be mentioned of branched organopolysiloxane oligomers or polymers are resins MQ, resins MDQ, resins TD and resins MDT, it being possible for the alkenyl groups to be carried by the units M, D and/or T. Examples which may be mentioned of particularly suitable resins are vinylated resins MDQ or MQ having a vinyl group content of between 0.2 and 10% by weight, these vinyl groups being carried by the units M and/or D.

This structural resin is advantageously present in a concentration of between 10 and 90% by weight, preferably of between 20 and 70% by weight and particularly preferably of between 25 and 60% by weight, based on all the constituents of the composition.

The polyaddition reaction is well known to those skilled in the art. A catalyst can also be used in this reaction. This catalyst can be selected especially from platinum and rhodium compounds. In particular, it is possible to use the complexes of platinum and an organic product described in patents U.S. Pat. Nos. 3,159,601, 3,159,602 and 3,220,972 and European patents EP-A-0 057 459, EP-A-0 188 978 and EP-A-0 190 530, and the complexes of platinum and vinylated organosiloxanes described in patents U.S. Pat. Nos. 3,419,593, 3,715,334, 3,377,432 and 3,814,730. The generally preferred catalyst is platinum. In this case the amount of catalyst (C), calculated as the weight of platinum metal, is generally between 2 and 400 ppm and preferably between 5 and 100 ppm, based on the total weight of the POS (A & A'), (B & B').

In the one-component systems, the silicone elastomer preparations also comprise at least one retarder E of the addition reaction (crosslinking inhibitor) selected from the following compounds:

polyorganosiloxanes which are advantageously cyclic and substituted by at least one alkenyl, tetramethylvinyltetrasiloxane being particularly preferred, pyridine, organic phosphines and phosphites, unsaturated amides, alkylated maleates, and acetylenic alcohols.

These acetylenic alcohols (cf. FR-B-1 528 464 and FR-A-2 372 874), which are among the preferred thermal blockers of the hydrosilylation reaction, have the formula

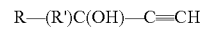

R—(R')C(OH)—C≡CH in which:

R is a linear or branched alkyl radical or a phenyl radical;

R' is H, a linear or branched alkyl radical or a phenyl radical;

it optionally being possible for the radicals R, R' and the carbon atom in the α-position to the triple bond to form a ring;

the total number of carbon atoms present in R and R' being at least 5 and preferably 9 to 20.

Said alcohols are preferably selected from those having a boiling point above 250° C. Examples which may be mentioned are:

1-ethynylcyclohexan-1-ol;

3-methyldodec-1-yn-3-ol;

3,7,11-trimethyldodec-1-yn-3-ol;

1,1-diphenylprop-2-yn-1-ol;

3-ethyl-6-ethylnon-1-yn-3-ol;

3-methylpentadec-1-yn-3-ol.

These α-acetylenic alcohols are commercial products.

Such a retarder E is present in an amount of at most 3000 ppm and preferably in an amount of 100 to 2000 ppm, based on the total weight of the organopolysiloxanes (A & A') and (B & B').

In one advantageous embodiment of the process according to the invention, it is possible to use an adhesion promoter F. This adhesion promoter F can comprise e.g.:

(F.1) at least one alkoxylated organosilane of the following general formula:

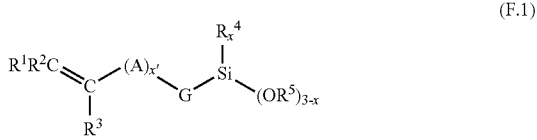

(F.1)

in which:
R¹, R², R³ are hydrogenated or hydrocarbon radicals that are identical to or different from one another and are hydrogen, a linear or branched $C_1$-$C_4$ alkyl or a phenyl optionally substituted by at least one $C_1$-$C_3$ alkyl;
A is a linear or branched $C_1$-$C_4$ alkylene;
G is a valence bond;
R⁴ and R⁵ are identical or different radicals and are a linear or branched $C_1$-$C_4$ alkyl;
x'=0 or 1;
x=0 to 2,
said compound (F.1) preferably being vinyltrimethoxysilane (VTMS);
(F.2) at least one organosilicon compound comprising at least one epoxy radical, said compound (F.2) preferably being 3-glycidoxypropyltrimethoxysilane (GLYMO);
(F.3) at least one chelate of a metal M and/or a metal alkoxide of the general formula M(OJ)$_n$, where n=valency of M and J=linear or branched $C_1$-$C_8$ alkyl, M being selected from the group comprising Ti, Zr, Ge, Li, Mn, Fe, Al and Mg, said compound (F.3) preferably being tert-butyl titanate.

The proportions of (F.1), (F.2) and (F.3), expressed in % by weight based on the total of the three, are preferably as follows:
(F.1)≧10,
(F.2)≧10,
(F.3)≦80.

Furthermore, this adhesion promoter F is preferably present in an amount of 0.1 to 10%, preferably of 0.5 to 5% and particularly preferably of 1 to 2.5% by weight, based on all the constituents of the preparation.

The preparations used in the process according to the invention can comprise a filler (G & G'), which will preferably be a mineral filler. It can consist of products selected from siliceous (or non-siliceous) materials.

Siliceous materials can play the role of reinforcing or semi-reinforcing fillers.

Reinforcing siliceous fillers are selected from colloidal silicas, powdered combustion silica and precipitated silica, and mixtures thereof.

These powders have a mean particle size generally of less than 0.1 µm and a BET specific surface area greater than 50 m²/g and preferably of between 100 and 300 m²/g.

Semi-reinforcing siliceous fillers, such as diatomaceous earths or ground quartz, can also be employed.

As far as non-siliceous mineral materials are concerned, these can be used as semi-reinforcing or bulking mineral fillers. Examples of these non-siliceous fillers, which can be used by themselves or in a mixture, are carbon black, titanium dioxide, aluminum oxide, hydrated alumina, expanded vermiculite, zirconia, a zirconate, non-expanded vermiculite, calcium carbonate, zinc oxide, mica, talcum, iron oxide, barium sulfate and slaked lime. These fillers have a particle size generally of between 0.1 and 300 µm and a BET surface area of less than 100 m²/g.

For practical purposes, but without implying a limitation, the filler employed is a silica.

The filler can be treated with any appropriate compatibilizing agent, especially hexamethyldisilazane. For further details on this subject, reference may be made e.g. to patent FR-B-2 764 894.

It is preferable to use reinforcing fillers in an amount of between 5 and 35 and preferably of between 7 and 30% by weight, based on all the constituents of the preparation. The content of non-reinforcing fillers used can be greater.

As regards the functional additives H which can be used, these can be covering products, e.g. pigments/colorants, or stabilizers.

In the process according to the invention, it is also possible to use a two-component system as a precursor for the preparations. This two-component system is characterized in that:
it is in two separate parts P1 and P2 which are intended to be mixed in order to form the composition;
one of these parts P1 and P2 comprises the catalyst C and a single polyorganosiloxane species (A or A') or (B or B'); and
the part P1 or P2 containing the polyorganosiloxane (B or B') is devoid of component (F.3) of the promoter F.

Thus the composition can consist e.g. of a part A comprising the components (F. 1) and (F.2), while the part P2 contains the component (d.3).

To obtain the two-component silicone elastomer composition P1-P2.

In the case where a filler is used, it is advantageous firstly to prepare a primary paste by mixing a mineral filler, at least part of the POS (B or B') and at least part of the polyorganosiloxane (A or A').

This paste serves as a base for obtaining on the one hand a part A resulting from the mixing of said paste with the polyorganosiloxane (B or B'), optionally a crosslinking inhibitor and finally the components (F.1) and (F.2) of the promoter F. The part P1 is produced by mixing part of the aforementioned paste with polyorganosiloxane (A or A'), catalyst (Pt) and components (F.3) of the promoter F.

The viscosity of the parts P1 and P2 and their mixture can be adjusted by altering the amounts of the constituents and choosing polyorganosiloxanes of different viscosity.

In the case where one or more functional additives H are employed, they are divided up between the parts P1 and P2 according to their affinity for the contents of P1 and P2.

Once they have been mixed with one another, the parts P1 and P2 form a ready-to-use silicone elastomer preparation (RTV-2) which e.g. can be applied to a substrate by any appropriate impregnating means (for example padding) and optionally any appropriate coating means (for example a knife or cylinder).

The crosslinking of the liquid (fluid) silicone composition applied to the substrate to be coated is generally activated e.g. by heating the impregnated or coated substrate to a temperature of between 50 and 200° C., the maximum heat resistance of the substrate obviously being taken into account.

According to another of its features, the present invention further relates to a liquid silicone formulation which can be used especially as a liquid silicone preparation (i) in the process as described above, and which comprises:
polyorganosiloxanes (POS) A with ≡Si-alkenyl (preferably ≡Si-vinyl) units,
polyorganosiloxanes (POS) B with ≡Si—H units,
at least one metal catalyst C, preferably based on platinum,
optionally at least one POS resin D carrying ≡Si-alkenyl (preferably ≡Si-vinyl) units,
optionally at least one crosslinking inhibitor E,
optionally at least one adhesion promoter F,
optionally at least one mineral filler G.

optionally at least one functional additive H for imparting specific properties, characterized in that the ratio R of ≡Si—H units to ≡Si-alkenyl (preferably ≡Si-vinyl) units is defined as follows:

R≦1, preferably 0.80≦R≦0.98.

Advantageously, this formulation has a content of ≡Si-alkenyl (preferably ≡Si-vinyl) units greater than or equal to at least 2% by number, preferably greater than or equal to at least 3% and particularly preferably of between 2 and 10% by number, the ≡Si-alkenyl (preferably ≡Si-vinyl) units advantageously being carried essentially by siloxy units D: —R$_2$SiO$_{2/2}$—.

The components A to H of this formulation are as defined above with reference to the description of the liquid silicone preparation (i) used in the process according to the invention.

The invention also provides a multilayer crosslinked silicone elastomer composite or coating obtainable by the process defined above, characterized in that it has a layer delamination resistance, measured by a test T, greater than 1 N/cm, preferably greater than 2 N/cm and particularly preferably greater than 3 N/cm.

To the inventors' knowledge, such high delamination resistance values have never been achieved for a composite of this type.

The process according to the invention is not limited to two steps for application and crosslinking of the silicone compositions to give composites having only two silicone elastomer layers. In fact, it is understood that the application and crosslinking steps (III) and (IV) can be repeated as many times as is necessary to obtain the desired number of silicone elastomer layers.

All the viscosities referred to in the present patent application correspond to a dynamic viscosity value at 25° C., i.e. the dynamic viscosity which is measured, in a manner known per se, at a sufficiently low shear velocity gradient for the measured viscosity to be independent of the velocity gradient.

The purpose of the Examples which follow is to illustrate particular embodiments of the invention without thereby limiting the scope of the invention to these embodiments alone.

EXAMPLE I

Preparation of a Reference Silicone Composition

The following are mixed gradually in the indicated proportions (parts by weight) in a reactor at room temperature:
47.7 parts of a resin M M(Vi) D(Vi) DQ containing about 0.6% of Vi;
30.6 parts of α,ω-diMeVi PDMS of viscosity 100 Pa·s, containing about 0.08% of Vi;
15 parts of α,ω-diMeVi PDMS of viscosity 10 Pa·s, containing about 0.135% of Vi;
5 parts of poly(diMe)(Methylhydrogenosiloxy)-α,ω)-diMethyldrogenosiloxy of viscosity 25 mPa·s, containing 20% of SiH;
0.023 part of ethynylcyclohexanol;
0.91 part of vinyltrimethoxysilane;
0.91 part of 3-glycidoxypropyltrimethoxysilane;
0.36 part of butyl titanate;
0.02 part of Karstedt platinum crosslinking catalyst.

In the above composition:
Vi is the vinyl group, which is the name used in the art to denote the C$_2$ alkenyl of the formula

and Me denotes the methyl group.

EXAMPLE II

Preparations of Silicone Compositions According to the Invention and Tests on these Compositions The following are mixed gradually in the indicated proportions (parts by weight) in a reactor at room temperature:

Preparation 1 According to the Invention
1. 58.6 parts of a resin M M(Vi) D(Vi) DQ containing about 0.6% of Vi;
2. 23.3 parts of α,ω-diMeVi PDMS of viscosity 100 Pa·s, containing about 0.08% of Vi;
3. 1.3 parts of (α,ω-diMeVi PDMS of viscosity 10 Pa·s, containing about 0.135% of Vi;
4. 7.3 parts of PDMS with MeVi units of viscosity 400 mPa·s, containing 2.5% of Vi;
5. 7.3 parts of poly(diMe)(Mehydrogenosiloxy)-α,ω-diMehydrogenosiloxy of viscosity 25 mPa·s, containing 20% of SiH;
6. 0.023 part of ethynylcyclohexanol;
7. 0.91 part of vinyltrimethoxysilane;
8. 0.91 part of 3-glycidoxypropyltrimethoxysilane;
9. 0.36 part of butyl titanate;
10. 0.02 part of Karstedt platinum crosslinking catalyst.

Preparation 2 According to the Invention
This is identical to preparation 1 except that component '5.' is introduced in an amount of only 4.6 parts.

Preparation 3 According to the Invention
This is identical to preparation 1 except that component '5.' is introduced in an amount of only 3.7 parts.

Preparation 4 According to the Invention
This is identical to preparation 1 except that component '5.' is introduced in an amount of only 3.2 parts.

Measurement of the Mechanical Properties of the Reference Preparation and Preparations 1 to 4

The above preparations are crosslinked. The Shore A hardness and the ultimate tensile characteristics are measured according to the known tests and standards commonly used by those skilled in the art. The results are shown in Table I below.

TABLE 1

|  | Reference | 1 | 2 | 3 | 4 |
|---|---|---|---|---|---|
| Shore A hardness | 23 | 38 | 30 | 20 | 12 |
| Elongation at break (%) | 195 | 145 | 155 | 125 | 165 |
| Tensile strength (MPa) | 1.5 | 4.5 | 3.6 | 0.9 | 0.7 |

Measurement of the Surface Density of Preparations 1-4
The surface density of residual reactive groups is defined as the number of these groups per unit surface area in the outermost surface layer of the material in question. In the case of silicones, the monomolecular layer has a thickness of 0.75 nm.

The surface density is consequently obtained by weighting the results of a prorata volume analysis of the thicknesses in question. This content will thus be expressed as:

no. of groups/nm$^2$

Any pertinent methods of analysis—chemical as well as spectral methods—are suitable for expressing the result.

In practice, 1 cm$^2$ pieces were cut out of the first crosslinked coatings deposited on polyester film, and a chemical analysis of these pieces was performed according to the following steps:
  attack with ethyl silicate under reflux,
  identification and assay of the resulting fragments by gas chromatography.

The results obtained are shown in Table 2 below:

TABLE 2

|  | Reference preparation | Preparation 1 | Preparation 4 |
|---|---|---|---|
| Vinyl groups in the sample (µg; molar mass: 27) | 1.5 | 3.1 | 1.06 |
| Surface density (groups/nm$^2$) | 0.005 | 0.010 | 0.035 |

Peel Test

A quantitative peel test was carried out in order to give the measurement of adhesion between the applied silicone layers a more general character.

The chosen test is performed on a composite of 2 supported coatings:
  A first coating is applied to a polyester (PET) film, i.e. a very flat film which avoids roughness effects. This first coating is then thermally crosslinked.
  A second, crude coating supported by a polyamide fabric is then brought into contact with the first. The assembly is brought to the appropriate temperature to ensure crosslinking of the second layer.
  The conditions applied are:
  a first coating of silicone composition at a rate of 50 g/m$^2$ on polyester film;
  crosslinking for one minute at 140° C.;
  a second coating of silicone composition at a rate of 100 g/m$^2$ on polyamide 6.6 fabric;
  lamination onto the first layer;
  crosslinking for one minute under a press (2 T) at 1 60° C.;
  measurement of the peel strength for a 180° geometry.

The values measured for the peel strength are expressed in N/cm.

Results of the Peel Test:

Reference Test

The reference preparation is applied under the conditions of the peel test described. The measured peel strength is:

1.0 N/cm

Test 1

Preparation I is applied under the conditions of the peel test described. The measured peel strength is:

0.7 N/cm

Test 2

Preparation 2 is applied under the conditions of the peel test described. The measured peel strength is:

0.9 N/cm

Test 3

Preparation 3 is applied under the conditions of the peel test described. The measured peel strength is:

1.3 N/cm

Test 4

Preparation 4 is applied under the conditions of the peel test described. The measured peel strength is:

3.1 N/cm

Test 4 bis

In contrast to test 4, the first layer of the composite, namely the one deposited on the polyester film, is the reference preparation, while the second layer, namely the one deposited on the polyamide fabric, remains preparation 4.

The measured peel strength is:

1.4 N/cm

Test 4 ter

In contrast to test 4, the first layer of the composite, namely the one deposited on the polyester film, remains preparation 4, but the second layer, namely the one deposited on the polyamide fabric, is the reference preparation.

The measured peel strength is:

3.3 N/cm

The invention claimed is:

1. Process for the production of an assembly comprising several silicone elements crosslinked by the polyaddition of ≡Si—H units onto ≡Si-alkenyl units, said elements adhering firmly to one another, comprising the following essential steps:
  (I) forming a silicone element (i) with a liquid silicone preparation (i) comprising:
    polyorganosiloxanes (POS) A with ≡Si-alkenyl units,
    polyorganosiloxanes (POS) B with ≡Si—H units,
    at least one metal catalyst C,
    optionally at least one POS resin D carrying ≡Si-alkenyl units,
    optionally at least one crosslinking inhibitor E,
    optionally at least one adhesion promoter F,
    optionally at least one mineral filler G,
    optionally at least one functional additive H for imparting specific properties,
  (II) crosslinking the liquid silicone preparation (i) formed in step (I), the composition of this preparation and the crosslinking conditions being chosen in such a way that the crosslinked silicone element (i) has a surface density SD of unreacted, residual alkenyl groups, per nm$^2$, equal to or greater than 0.035,
  (III) optionally repeating steps (I) and (II) n times (n=positive integer) to give n elements (i) that adhere to one another,
  (IV) forming a silicone element (ii) by bringing the crosslinked silicone element or last crosslinked silicone element (i) into contact with a liquid silicone preparation (ii) comprising:
    polyorganosiloxanes (POS) A' with ≡Si-alkenyl units,
    polyorganosiloxanes (POS) B' with ≡Si—H units,
    at least one metal catalyst C', optionally at least one POS resin D' carrying ≡Si-alkenyl units,
optionally at least one crosslinking inhibitor E',
optionally at least one adhesion promoter F',
optionally at least one mineral filler G',
optionally at least one functional additive H' for imparting specific properties,
(V) crosslinking the liquid silicone preparation (ii) formed in step (IV) to give the crosslinked silicone element (ii) that adheres to the element or last element (i).

2. Process according to claim 1, wherein a ratio R of the ≡Si—H units to the ≡Si-alkenyl units in the selected liquid silicone preparation (i) is defined as follows:

$R \leq 1$.

3. Process according to claim 2, wherein the selected liquid silicone preparation (i) comprises at least one hyperalkenylated polyorganosiloxane A° providing ≡Si-alkenyl units, whose content is greater than or equal to at least 2% by number, the ≡Si-alkenyl units advantageously being carried essentially by siloxy units D: —$R_2SiO_{2/2}$— wherein R is a non-hydrolyzable monovalent hydrocarbon group which is devoid of an unfavorable action on the activity of the catalist and which is optionally halogenated.

4. Process according to claim 1, wherein:
the assembly produced comprises a flexible substrate and several crosslinked silicone elements forming a multilayer coating adhering to the substrate;
and:
step (I) comprises applying the liquid silicone preparation (i) to the substrate to form a crosslinked silicone layer (i),
and step (IV) comprises applying the liquid silicone preparation (ii) to the crosslinked silicone layer or last crosslinked silicone layer (i) carrying residual reactive groups on the surface, to form a crosslinked silicone layer (ii).

5. Process according to claim 1, wherein the assembly produced is a silicone mold or molded object.

6. Process according to claim 1, wherein steps (IV) and (V) are only carried out after a prolonged interruption of the process.

7. Process according to claim 4, wherein the second and last liquid silicone preparation is different from the first and is devoid of hyperalkenylated polyorganosiloxanes A°.

8. Process according to claim 1, wherein the chosen POS (A & A') have siloxy units of the formula $$W_a Z_b SiO_{(4-(a+b))/2} \quad (1)$$

in which:
the symbols W, which are identical or different, are each an alkenyl group;
the symbols Z, which are identical or different, are each a non-hydrolyzable monovalent hydrocarbon group that is devoid of an unfavorable action on the activity of the catalyst, is optionally halogenated and is selected from alkyl groups having from 1 to 8 carbon atoms inclusive, and from aryl groups;
a is 1 or 2, b is 0, 1 or 2 and a+b is between 1 and 3;
optionally at least some of the other units are units of the empirical formula $$Z_c SiO_{(4-c)/2} \quad (2)$$

in which Z is defined as above and c has a value of between 0 and 3.

9. Process according to claim 1, wherein the chosen POS (B & B') have siloxy units of the formula $$H_d L_e SiO_{(4-(d+e))/2} \quad (3)$$

in which:
the symbols L, which are identical or different, are each a non-hydrolyzable monovalent hydrocarbon group that is devoid of an unfavorable action on the activity of the catalyst, is optionally halogenated and is selected from alkyl groups having from 1 to 8 carbon atoms inclusive, and from aryl groups;
d is 1 or 2, e is 0, 1 or 2 and d+e has a value of between 1 and 3;
optionally at least some of the other units being units of the empirical formula $$L_g SiO_{(4-g)/2} \quad (4)$$

in which L is as defined above and g has a value of between 0 and 3.

10. Process according to claim 1, wherein the alkenyl groups W of the POS (A & A') and/or of the POS resins (D & D') are vinyl groups Vi carried by siloxy units D and optionally M and/or T.

11. The process of claim 1, wherein said ≡Si-alkenyl units comprise ≡Si-vinyl units.

12. The process of claim 1, wherein said residual alkenyl groups comprise vinyl groups.

13. The process of claim 3, wherein said liquid silicone preparation (i) comprises at least one hypervinylated POS A providing ≡Si-vinyl units whose content is between 3 and 10% by number.

14. The process of claim 1, wherein said alkenyl group is a $C_2$-$C_6$ alkenyl group.

15. The process of claim 2, wherein the ratio R of the ≡Si—H units to the ≡Si-alkenyl units in the selected liquid silicone preparation (i) is defined as follows:

$0.80 \leq R \leq 0.98$.

* * * * *